US010282795B2

(12) United States Patent
Ghosh et al.

(10) Patent No.: US 10,282,795 B2
(45) Date of Patent: May 7, 2019

(54) REAL-TIME FORECASTING OF ELECTRICITY DEMAND IN A STREAMS-BASED ARCHITECTURE WITH APPLICATIONS

(71) Applicant: International Business Machines Corporation, Armonk, NY (US)

(72) Inventors: Soumyadip Ghosh, Peekskill, NY (US); Jonathan R. Hosking, Scarsdale, NY (US); Ramesh Natarajan, Pleasantville, NY (US); Shivaram Subramanian, New Fairfield, CT (US); Xiaoxuan Zhang, Jersey City, NJ (US)

(73) Assignee: International Business Machines Corporation, Armonk, NY (US)

( * ) Notice: Subject to any disclaimer, the term of this patent is extended or adjusted under 35 U.S.C. 154(b) by 333 days.

(21) Appl. No.: 15/189,173

(22) Filed: Jun. 22, 2016

(65) Prior Publication Data

US 2017/0371308 A1    Dec. 28, 2017

(51) Int. Cl.
*G06Q 50/06* (2012.01)
*G05B 15/02* (2006.01)
(Continued)

(52) U.S. Cl.
CPC ............. *G06Q 50/06* (2013.01); *G05B 15/02* (2013.01); *G06Q 10/04* (2013.01);
(Continued)

(58) Field of Classification Search
CPC ............ G05B 2219/2639; G05B 15/02; G05B 19/042; G06Q 50/06
(Continued)

(56) References Cited

U.S. PATENT DOCUMENTS 6,577,962 B1 *   6/2003   Afshari .................. G06Q 10/06
                                                              700/291
8,528,345 B2     9/2013   Parsonnet et al.
(Continued)

OTHER PUBLICATIONS

Mevissen et al.; "Energy demand forecasting for smart grids"; downloaded from https://www.research.ibm.com/labs/ireland/applications/energy_demand_forecasting.html on Mar. 24, 2016; whole document (2 pages).
(Continued)

*Primary Examiner* — Chun Cao
(74) *Attorney, Agent, or Firm* — Harrington & Smith (57) ABSTRACT

A streams platform is used. Multiple streams of electricity usage data are received, each from an electrical meter providing periodic updates to electrical usage for devices connected to the electrical meter. Weather information is received corresponding to locations where the electrical meters are. Real-time predictive modeling of electricity demand is performed based on the received multiple streams of electricity usage data and the received weather information, at least by performing: updating a state space model for electrical load curves using the usage data from the streams and the weather, wherein the updating uses current load observations for the multiple streams for a current time period; and creating forecast(s) for the electricity demand. The forecast(s) of the electricity demand are output. Appliance-level predictions may be made and used, and substitution effects and load management functions may be performed.

21 Claims, 8 Drawing Sheets

(51) Int. Cl.
*G06Q 10/04* (2012.01)
*G06Q 10/06* (2012.01)

(52) U.S. Cl.
CPC . *G06Q 10/0631* (2013.01); *G05B 2219/2639* (2013.01); *Y04S 10/54* (2013.01)

(58) Field of Classification Search
USPC .................................................. 700/282, 291
See application file for complete search history.

(56) References Cited

U.S. PATENT DOCUMENTS

| | | | | |
|---|---|---|---|---|
| 9,163,828 | B2* | 10/2015 | Beveridge | F01K 13/02 |
| 9,366,704 | B2* | 6/2016 | Haghighat-Kashani | |
| | | | | G06Q 10/04 |
| 2008/0215302 | A1* | 9/2008 | Nasle | G06F 17/5009 |
| | | | | 703/13 |
| 2010/0217550 | A1* | 8/2010 | Crabtree | H02J 3/005 |
| | | | | 702/62 |
| 2011/0231320 | A1* | 9/2011 | Irving | G06Q 30/00 |
| | | | | 705/80 |
| 2012/0083930 | A1* | 4/2012 | Ilic | G06Q 30/06 |
| | | | | 700/287 |
| 2013/0253898 | A1* | 9/2013 | Meagher | G06F 17/5009 |
| | | | | 703/18 |
| 2014/0039699 | A1* | 2/2014 | Forbes, Jr. | G05B 19/02 |
| | | | | 700/286 |
| 2014/0129040 | A1 | 5/2014 | Emadi et al. | |
| 2014/0324532 | A1* | 10/2014 | Ghosh | G06Q 30/0202 |
| | | | | 705/7.31 |
| 2014/0365022 | A1 | 12/2014 | Ghosh et al. | |
| 2014/0365024 | A1 | 12/2014 | Ghosh et al. | |
| 2015/0046221 | A1 | 2/2015 | Narayan et al. | |
| 2015/0170297 | A1 | 6/2015 | Chen et al. | |
| 2015/0309092 | A1 | 10/2015 | Yu et al. | |
| 2015/0331023 | A1 | 11/2015 | Hwang et al. | |

OTHER PUBLICATIONS

Ba et al.; "Adaptive Learning of Smoothing Functions: Application to Electricity Load Forecasting"; Advances in Neural Information Processing Systems 25 (NIPS 2012); pp. 2519-2527.

Wijaya et al.; "Forecasting Uncertainty in Electricity Demand"; AAAI-15 Workshop on Computational Sustainability, Austin, TX; Jan. 26, 2015; whole document (7 pages).

Alzate et al.; "Improved electricity load forecasting via kernel spectral clustering of smart meters"; IEEE 13th International Conference on Data Mining (ICDM); 2013; pp. 943-948.

Fiot et al.; "Electricity Demand Forecasting by Multi-Task Learning"; arXiv:1512.08178v1 [cs.LG]; 2015; whole document (16 pages).

Triantafyllopoulos; "Covariance Estimation for Multivariate Conditionally Gaussian Dynamic Linear Models"; Journal of Forecasting, 26; 2008; pp. 551-569.

Burger et al.; "Gated Ensemble Learning Method for Demand-Side Electricity Load Forecasting"; Energy and Buildings 109; 2015; pp. 23-34.

Hosking et al.; "Short-Term Forecasting of the Daily Load Curve for Residential Electricity Usage in the Smart Grid"; Applied Stochastic Models in Business and Industry, 29; 2013; pp. 604-620.

Anonymous; "A Method for Load Forecasting Based on Identification"; IPCOM000226000D; Mar. 20, 2013; whole document (8 pages).

* cited by examiner

| Stream | Description | Schema |
|---|---|---|
| (1) | Measured load readings in any time-frequency, e.g. 20 readings of load spaced 25-mins apart | [ < customer group ID, time-stamp , load in kW> ] |
| (2) | Measured load aligned to forecasting model's base frequency, e.g. model could be for 15-min intervals | [ < model index of day, model index of interval-in-day, cust ID, load in kW> ] |
| (3) | Measured weather data (ambient temperature in F) in any time-frequency , e.g. hourly | [ <time-stamp, Temperature in F> ] |
| (4) | Measured weather data standardized in model's base frequency and units | [ < model index of day, model index of interval-in-day, Temperature in C > ] |
| (5) | Temperature forecast data in any time-frequency, e.g. hourly | [ <time-stamp, Temperature in F> ] |
| (6) | Temperature forecast aligned to model | [ < model index of day, model index of interval-in-day, Temperature in C > ] |
| (7) | Current day and interval-in-day | < index of current day, index of current interval-in-day > |
| (8) | Measured readings for whole days | [ < index of day, index of interval-in-day, cust ID, load in kW, Temperature in C > ] |
| (9) | Merged measured readings for current (partial-)day | [ < index of interval-in-day, cust ID, load in kW, Temperature in C > ] |
| (10) | Load Forecast for n days (index-0 is today) | [ < index of day, index of interval-in-day, cust ID, load in kW > ] |
| (11) | Forecast quality report | [ < index of forecast-day, index of forecast-interval-in-day, %-RMSE or MAPE > ] |

REAL-TIME FORECASTING OF ELECTRICITY DEMAND IN A STREAMS-BASED ARCHITECTURE WITH APPLICATIONS

GOVERNMENT LICENSE RIGHTS STATEMENT

This invention was made with Government support under Contract No.: DEOE0000190 awarded by Department of Energy. The Government has certain rights in this invention.

BACKGROUND

The present invention relates to power generation, distribution, and control networks, and more particularly to forecasting of electricity demand using these networks.

This section is intended to provide a background or context to the invention disclosed below. The description herein may include concepts that could be pursued, but are not necessarily ones that have been previously conceived, implemented or described. Therefore, unless otherwise explicitly indicated herein, what is described in this section is not prior art to the description in this application and is not admitted to be prior art by inclusion in this section.

Demand forecasting has always been central to electricity generation, distribution and control. There are recent developments associated with the so-called "Smart Grid", however, that have considerably increased the stakes for demand forecasting.

For instance, smart meters are being installed in many locations. These smart meters can provide residential electricity usage data that is collected in, e.g., 5-15 minute intervals. It is unclear how this fine-grained and disaggregated usage data (that is, from single premises) can be exploited in real time.

As another example, integration of renewable sources of energy (such as solar panels or wind turbines) has been rapidly expanding. There is currently increased volatility due to the impact of renewable energy and distributed generation. One issue is how this volatility be accounted for in the intra-day forecasts.

Another development of concern is demand substitutability. In particular, residential usage involves a daily demand cycle with simultaneity and correlation effects. How can these effects be included in a time-series based forecasting system? Some possible forecasting systems are outlined in U.S. patent application Ser. No. 13/912,181, filed on Jun. 6, 2013, published as U.S. Publication No. 2014/0365022 and U.S. patent application Ser. No. 13/918,312, filed on Jun. 14, 2013, published as U.S. Publication No. 2014/0365024, both of which are entitled "Managing Time-Substitutable Electricity Usage using Dynamic Controls".

Transactive controls are an additional recent development in the power grid. Two-way communication of transactive signals (e.g., sequences of forecasted demand and forecasted price) are used in some systems. One issue is how the forecast values be used to improve demand response and enhance grid stability.

An additional recent development concerns feedback to consumers. For example, consumers can now be informed in near real time of their usage patterns relative to a peer group. An issue with this is how this feedback can be structured so as to improve the grid's overall efficiency and reliability.

SUMMARY

This section is intended to include examples and is not intended to be limiting.

A method is disclosed in an exemplary embodiment. The method includes receiving at a streams platform multiple streams of electricity usage data, each of the multiple streams from an electrical meter providing periodic updates to electrical usage for devices connected to the electrical meter. The method includes receiving at the streams platform weather information corresponding to locations where the electrical meters are. The method further includes performing by the streams platform real-time predictive modeling of electricity demand based on the received multiple streams of electricity usage data and the received weather information, at least by performing the following: updating a state space model for electrical load curves using the usage data from the streams and the weather, wherein the updating uses current load observations for the multiple streams for a current time period; and creating one or more forecasts for the electricity demand. The method also includes outputting by the streams platform the one or more forecasts of the electricity demand.

Another example is a computer program product, which comprises a computer readable storage medium having program instructions embodied therewith. The program instructions are executable by a computer system to cause the computer system to perform the following: receiving at a streams platform multiple streams of electricity usage data, each of the multiple streams from an electrical meter providing periodic updates to electrical usage for devices connected to the electrical meter; receiving at the streams platform weather information corresponding to locations where the electrical meters are; performing by the streams platform real-time predictive modeling of electricity demand based on the received multiple streams of electricity usage data and the received weather information, at least by performing the following: updating a state space model for electrical load curves using the usage data from the streams and the weather, wherein the updating uses current load observations for the multiple streams for a current time period; and creating one or more forecasts for the electricity demand; outputting by the streams platform the one or more forecasts of the electricity demand.

In a further exemplary embodiment, an apparatus is disclosed that includes a memory including computer-readable program code, and includes one or more processors. The one or more processors are configured, in response to loading and executing the computer-readable program code, to cause the apparatus to perform operations comprising: receiving multiple streams of electricity usage data, each of the multiple streams from an electrical meter providing periodic updates to electrical usage for devices connected to the electrical meter; receiving weather information corresponding to locations where the electrical meters are; performing real-time predictive modeling of electricity demand based on the received multiple streams of electricity usage data and the received weather information, at least by performing the following: updating a state space model for electrical load curves using the usage data from the streams and the weather, wherein the updating uses current load observations for the multiple streams for a current time period; and creating one or more forecasts for the electricity demand; outputting the one or more forecasts of the electricity demand.

BRIEF DESCRIPTION OF THE SEVERAL VIEWS OF THE DRAWINGS

FIG. 1, which includes both FIGS. 1A and 1B, illustrates an exemplary architecture of a real-time forecasting system implemented in an electrical power distribution system in an exemplary embodiment, where FIG. 1A illustrates an overview of the electrical power distribution system, and FIG. 1B has a more detailed view on some of the components of the electrical power distribution system.

FIG. 4, which includes FIGS. 4A and 4B, is an illustration of constructing hierarchical forecasts using non-hierarchical forecasting techniques applied at multiple levels of streams aggregation, where FIG. 4A illustrates aggregation and forecast hierarchy, and FIG. 4B is a logic flow diagram for constructing hierarchical forecasts;

DETAILED DESCRIPTION

The word "exemplary" is used herein to mean "serving as an example, instance, or illustration." Any embodiment described herein as "exemplary" is not necessarily to be construed as preferred or advantageous over other embodiments. All of the embodiments described in this Detailed Description are exemplary embodiments provided to enable persons skilled in the art to make or use the invention and not to limit the scope of the invention which is defined by the claims.

As previously described, there are recent developments associated with the smart grid that have considerably increased the stakes for demand forecasting. The exemplary embodiments herein address those and other developments.

As an overview, methods are disclosed herein for using a streams-based computational platform for electricity demand forecasting, and also for using dynamic state space models for daily residential load curves in exemplary embodiments. A streams platform is a platform where many streams of data come into the platform and are operated on by the platform. This example may involve a self-contained approach, in which model specification, model calibration and model forecasting is performed entirely within the streams platform. Furthermore, a fully data-driven and adaptive approach is disclosed to electricity demand forecasting. For instance, modeling of demand substitution effects may be performed across the entire demand cycle. The techniques can be used for real-time updates of intra-day and inter-day forecasts, e.g., in each case, making use of the most recent, intra-day (e.g., smart meter) observations to update these forecasts. This results in a robust and reliable approach even in the "sparse data" regime (e.g., during "cold-start" or when abnormal weather conditions require "model extrapolation"). Further, these techniques allow for instantaneous use of hierarchies due to geography, usage type, and/or appliance type in forecasting.

A streams-based approach provides the platform for aggregating streams data such as that from hundreds, thousands, or hundreds of thousands of smart meters and for combining with other relevant real-time data (e.g., weather). Additionally, usage forecasts can be generated for a multiplicity of aggregate sets (e.g., house, neighborhood, town, city, and/or state) as desired. Forecasts can be integrated into other potential streams applications (e.g., transactive controls, dynamic pricing, anomaly detection, incentive design). In a stream-based system, such applications may be written and implemented in a scripting language, which allows an application (or part of the application) to be written once but then the same code can be applied to different data. The streams applications interact with the streams and can process the data from the streams.

The transformation of the electricity generation and distribution network, and its integration with the internet of information and the internet of things (IoT), is one of the major potential business drivers in the economy, with considerable investment from the government and private sector. Most electricity demand forecasting applications today do not have any real-time operation, and do not collect highly disaggregated residential data at a fine time-scale (e.g., few minutes or even real time). There are numerous applications for the data collection and processing as described herein.

Figure 1:
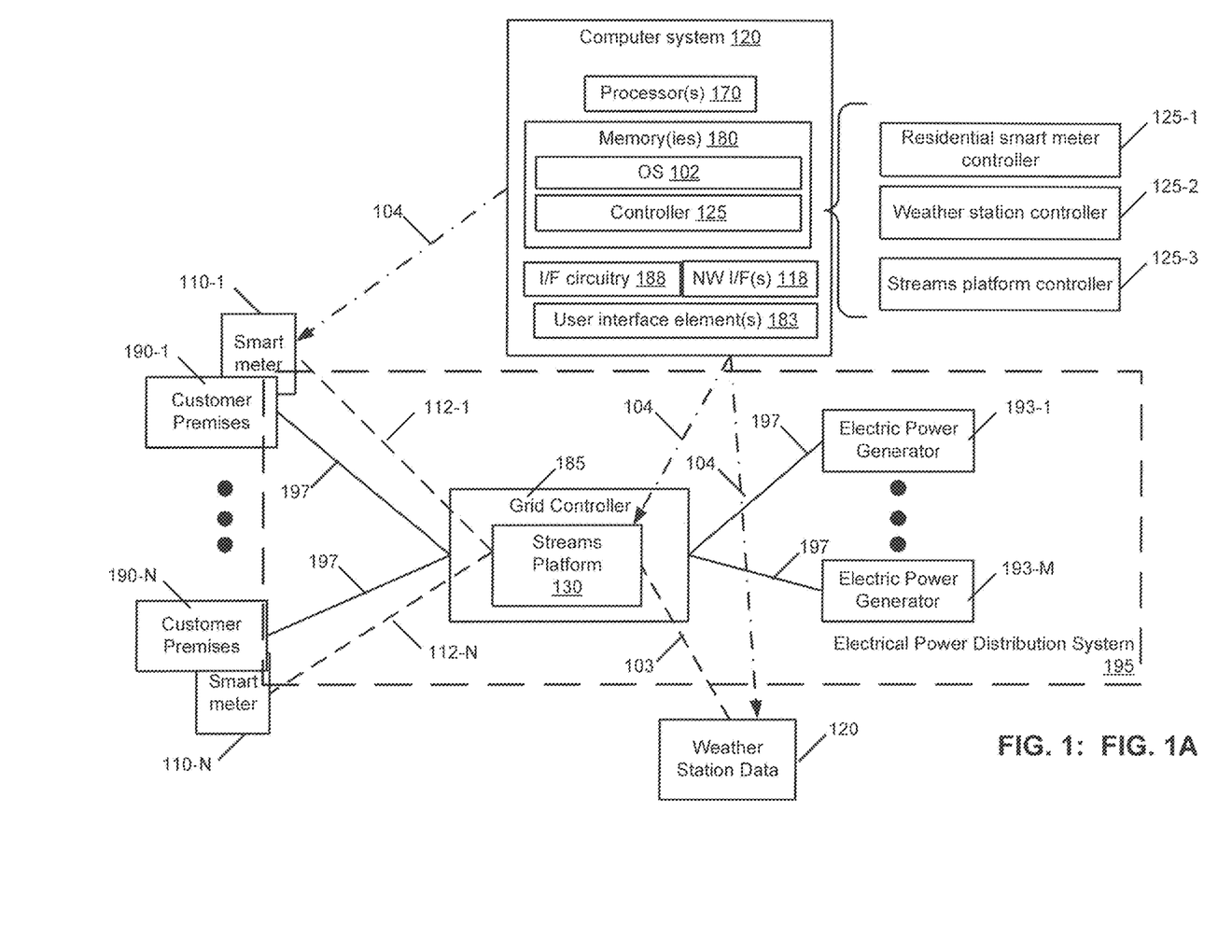

Now that an overview has been provided, additional detail is provided. Reference is made to FIG. 1, which includes both FIGS. 1A and 1B. This figure illustrates an exemplary architecture of a real-time forecasting system implemented in an electrical power distribution system in an exemplary embodiment. FIG. 1A illustrates an overview of the electrical power distribution system 195, and FIG. 1B has a more detailed view on some of the components of the electrical power distribution system. In particular, FIG. 1B has a more detailed view of the streams platform 130.

The electrical power distribution system 195 includes an electrical grid 197 connected to N customer premises 190, each of which has a corresponding smart meter 110, and also to M electrical power generators 193. The customer premises 190 are connected via a portion of the electrical grid 197 to a grid controller 185. The grid controller 185 also is connected via a portion of the electrical grid 197 to one or more electric power generators 193-1 through 193-M. The grid controller 185 in this example contains the streams platform 130. The electrical power grid controller 185 monitors the electrical load demand in the electrical power distribution system 195 and controls distribution of electrical power from the electrical power generators 193 to the plurality of customers through the electrical grid 197. Note that the streams platform 130 may also be implemented separately (e.g., in the cloud) from the electrical power distribution system 195, but would be coupled to the grid controller 185.

In this example, there are N residential smart meters 110-1 through 110-N, where N can be arbitrarily large. A smart meter is typically defined as an electronic device that records consumption of electric energy in intervals of an hour or less and communicates that information back to a utility for monitoring and billing. Smart meters generally enable two-way connections between the smart meter and the utility (e.g., the operator of the grid controller 185).

Each residential smart meter 110 produces a corresponding usage data stream 1 of the usage data streams 1-1 through 1-N (see FIG. 1B). The data streams 1-1 through 1-N are communicated via corresponding links 112-1 through 112-N to the streams platform 130 (see FIG. 1A). The links 112 may be communicated using the grid 197 or communicated separately from the grid 197 (e.g., using a wireless cellular system for instance). The usage data streams 1 comprise electrical usage information for the residence to which the residential smart meter 110 is connected. In this case, each smart meter 110 is located at a customer premises 190. It is noted that the smart meters 110 herein are primarily referred to as "residential" smart meters and the customer premises 190 are referred to as residences. However, the smart meters 110 may also be connected to small or large commercial buildings or any other structure that uses electricity and the customer premises 190 may therefore be commercial.

There is a weather station data device (or devices) 120 that produces weather data streams 2 and 3 (see FIG. 1B). The data streams 1 and 3 are communicated by the weather station data device 120 to the streams platform 130 via the link 103 (see FIG. 1A), which may be carried by the electrical grid 197 or by a wired or wireless network. A streams platform 130 is shown in more detail in FIG. 1B, and this platform receives the data streams 1, 2, and 3. The beacon 1 105-1 (for the residential smart meters 110), beacon 2 105-2 (for the weather station data device 120) and beacon 3 105-3 (for the streams platform 130) can be fired, e.g., at different frequencies for simulating source data streams for testing purposes. In particular, the beacons 105 may drive the regular collection of data at preset frequencies during normal operations. It is noted that there could be multiple beacons 1 105-1 for the residential smart meters 110 (e.g., one beacon could fire multiple meters 110 in a certain area such as a town or street, or there could be one beacon per smart meter).

The streams platform 130 comprises the following functions: data standardization A (producing streams 1', 2', and 3'); data merging and aggregation B (producing streams 5 and 6); model time of day C (producing stream 4); dynamic recalibration of models D (the improved recalibrated model is used to generate the new forecasts E); dynamic update of forecasts E (producing forecast data streams 7); and forecast quality monitor F (producing data stream 8). These functions and their data streams are described below.

In FIG. 1A, a computer system 120 is shown. Computer system 120 can be and can implement (as illustrated by arrows 104) part or all of a residential smart meter 110, a weather station data device 120, and/or the streams platform 130. The computer system 120 includes one or more processors 170, one or more memories 180 including an operating system (OS) 102 and a controller 125, interface (I/F) circuitry 188, one or more network (N/W) interfaces (I/F(s)) 118, and one more user interface elements 183. The operating system 102 is system software that manages computer hardware and software resources and provides common services for computer programs. The controller 125 is specific to the device 110, 120, or 130: the controller 125 for a residential smart meter 110 is a residential smart meter controller 125-1; the controller 125 for a weather station data device 120 is a residential smart meter controller 125-2; and the controller 125 for a streams platform 130 is a residential smart meter controller 125-3.

The I/F circuitry 188 and user interface element(s) 188 may not be used, depending on implementation. For instance, the devices 110, 120, and 130 could be implemented without these, e.g., and the main or even sole connection method would be through the NW I/F(s) 118. The I/F circuitry 188 can be any circuitry to connect the user interface element(s) 183 with the computer system. The user interface element(s) 183 could include a display, keyboard, touch screen, mouse, or the like.

The OS 102 and controller 125 could be separate as illustrated or combined into one entity. The controller 125 could perform the functionality described herein. In particular, the controller 125 could perform the functionality of entities A through F of the streams platform 130. The controller 125 could be implemented in hardware, e.g., as part of the one or more processors 170, or could be implemented as computer-readable code, e.g., in the one or more memories 180, or some combination of hardware and computer readable code could be used. The controller 125 may also be implemented in hardware via elements other than the processor(s) 170, such as programmable logic like gate arrays or integrated circuits. The one or more processor(s) 170 may be any processor suitable for the local environment, such as single- or multiple-core processors, digital signal processors, embedded processors, and the like. The one or more memories 180 may be any combination of short term or long term memories, such as static RAM, dynamic RAM, hard drives, optical memory, flash memory, and the like.

The NW I/F(s) could include any networking interface, such as a wireless cellular, Bluetooth (a short range wireless connectivity standard), Wi-Fi (a technology that allows electronic devices to connect to a wireless LAN (WLAN) network) network, and/or a wired network such as the power lines or a local area network (LAN) based on, e.g., Ethernet.

Figure 2:
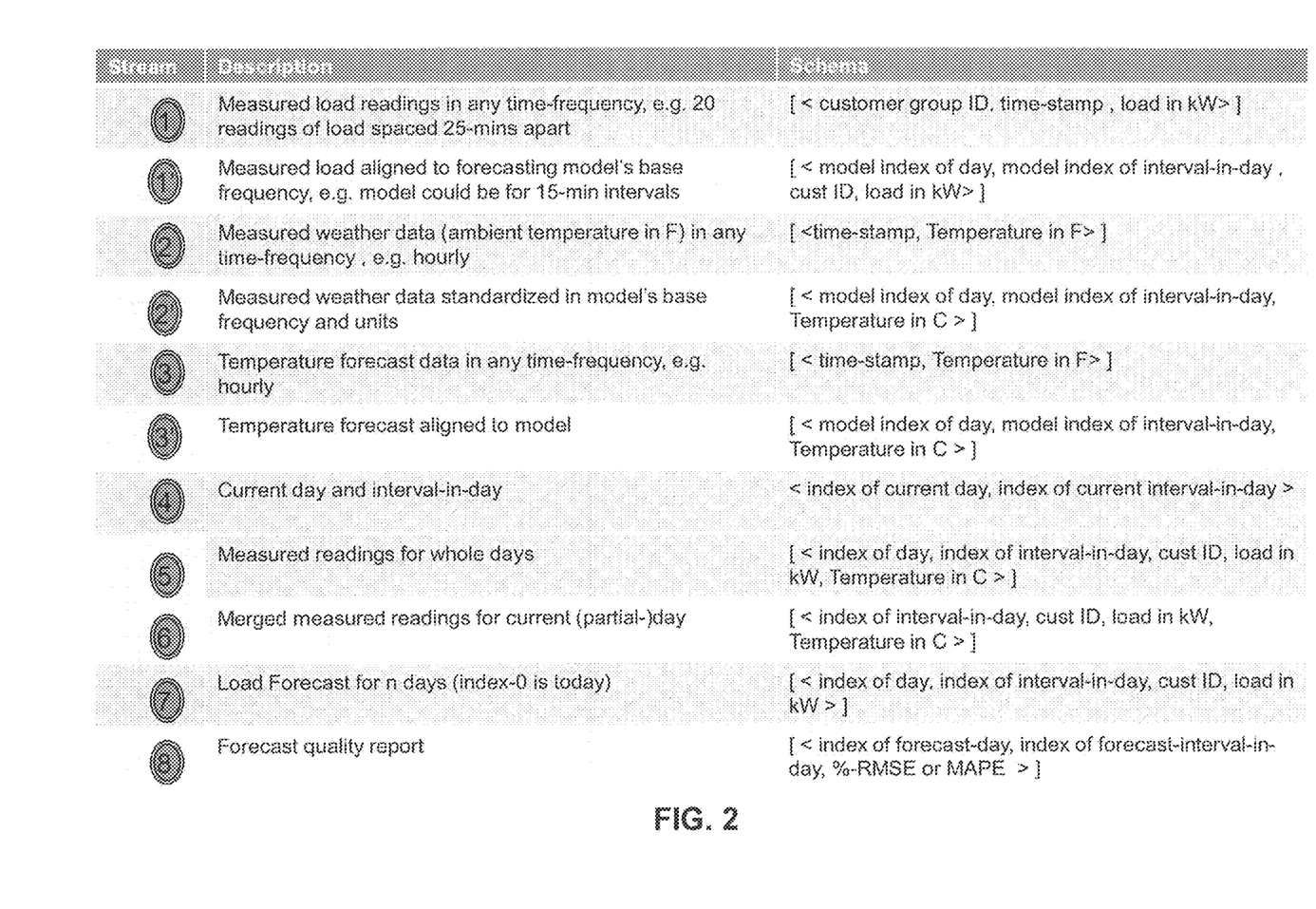
FIG. 2 is a table illustrating detailed schema for all data streams, where the brackets "[ ]" indicate an array and the symbols "< >" indicate a tuple.

Referring to FIG. 2, this figure is a table illustrating detailed exemplary schema for all data streams, where the brackets "[ ]" indicate an array and the symbols "< >" indicate a tuple. These are as follows. It is noted that an exemplary embodiment for electricity forecasting uses a model (a state space model), and the term "model" in FIG. 2 refers to the model used for forecasting.

The usage data stream 1 includes measured load readings in any time-frequency, e.g., 20 readings of load spaced 25-minutes (mins) apart. The schema is [<customer group ID, time-stamp, load in kilowatts (kW)>]. The usage data 1' from the data standardization A function includes measured load aligned to the forecasting model's base frequency, e.g. the model could be for 15-min intervals. The schema is [<model index of day, model index of interval-in-day, customer (cust) identification (ID), load in kW>]. The data stream 2 includes measured weather data (ambient temperature in degrees Fahrenheit, F) in any time-frequency, e.g. hourly, and the schema is [<time-stamp, Temperature in F>]. The data stream 2' from the data standardization A function includes measured weather data standardized in model's base frequency and units, and the schema is [<model index of day, model index of interval-in-day, Temperature in Celsius (C)>]. Note that the model uses Celsius instead of Fahrenheit.

The data steam 3 from the weather data station device 120 includes temperature forecast data in any time-frequency, e.g. hourly, and uses the schema [<time-stamp, Temperature in Fahrenheit (F)>]. The data stream 3' from the data standardization A function includes a temperature forecast aligned to the state space model, and uses the schema [<model index of day, model index of interval-in-day, Temperature in Celsius (C)>]. The data stream 4 from the model time of day C function includes current day and interval-in-day and uses the schema <index of current day, index of current interval-in-day >. The data stream 5 from the data merging and aggregation B function comprises measured readings for whole days, and uses the schema [<index of day, index of interval-in-day, customer (cust) identification (ID), load in kW (kiloWatts), Temperature in Celsius (C)>].

The data stream 6 from the data merging and aggregation B function includes merged measured readings for the current (partial-) day and uses the schema [<index of interval-in-day, oust ID, load in kW, Temperature in C>]. The forecast data streams 7 from the dynamic update of forecasts E function includes a load forecast for n days (index-0 is today), and uses schema [<index of day, index of interval-in-day, customer (cust) identification (ID), load in kW>]. The data stream 8 from the forecast quality monitor F function includes a forecast quality report, which uses the schema [<index of forecast-day, index of forecast-interval-in-day, %-RMSE or MAPE>], where RMSE means root mean square error and MAPE means mean absolute percentage error. These are standard metrics used to quantify forecast accuracy. For instance, percent RMSE=$\sqrt{E(\hat{y}-y)^2}/y$, where $\hat{y}$ are the forecasts and y are the actual values, and the E(·) represents an average over some range of historical readings where the forecasts and the actual values can be compared. As another example, MAPE=E|$(\hat{y}-y)/y$|, using the definitions above.

The following includes detailed specifications of all operator functions A through F in the streams platform 130 (see FIG. 1B). It is noted that these are merely exemplary and the streams platform 130 may include some or all of these functions and may also include additional or different functions.

The data standardization A function takes all input data (measured, forecast, etc.) that come with time-stamps and converts them into data in the same frequency that the model expects, and converts timestamps into index of a day and interval within the day. So, datum date may be Jan. 1, 2006, and so Jun. 20 2007 6:15 pm is <535, 73> assuming a 15-min frequency model. That is, there are 535 days between Jun. 20, 2007 and January (Jan.) 1, 2006. There are 73 15-minute (min) blocks from midnight to 6:15 pm.

The data merging and aggregation B function collates measured data for load and temperature, and produces two outputs, one for complete sets of day-long data (that might have missing values in them) and partial-day data for the current day. The data merging and aggregation B function is driven by the beacon 3 105-3 (through a Model Time-of-Day C function) to produce the two outputs (data streams 5 and 6). The data merging and aggregation B function uses a counter for the latest step to which we have merged. This function produces a standardized data time series for use both in dynamic forecasting and dynamic model recalibration. All data emerging from this is now based on a single consistent set of indexes.

If time-of-day data (data stream 4, which may be generated from a standardized network time protocol) indicates that the data in data stream 1' and data stream 2' spans a previous day or more, even if one or both steams have missing data, then data in the data stream 4 is produced. In some embodiments, data steam 5 is produced no matter what for the current day, even if there are no measurements.

Regarding the model time-of-day C function, this function reports the current day index and model-interval index for the current time. This stream will trigger forecasting, and is in turn triggered by a beacon (beacon 3 105-3).

The dynamic recalibration of models D function updates the model's state when day-long data comes in. In particular, function D calibrates a state space model. Function D should also handle missing data cases For instance, the missing data cases could be estimated from the 15 minute data that exists and the day-long data. Any reasonable imputation method based on available data may be used for the missing data cases. Function D may be combined with next function (the dynamic update of forecasts E function) in order to keep it simple in an implementation: streams 4 and 5 are produced as the same time, so a race-condition might occur between this function's model state update and the next function's forecast production.

Concerning the dynamic update of forecasts E function, this function uses a filter to produce the forecast for n days, where the first day should expect a partial state information from data stream 5. That is, function E uses the model calibrated by function D to perform dynamic forecasting. This function reads the model's state so this function could get into a race-condition with the function above (the dynamic recalibration of models function D).

The forecast quality monitor F function keeps a window of n-days of forecasts at hand and compares them against measured load data from data stream 5 to produce a report (in data stream 8) of forecast accuracy per interval within the n-days horizon. More specifically, data from stream 7 is stored and compared against data stream 5.

The streams platform 130 performs a dynamic calibration and forecasting algorithm. This algorithm implements the state space model referred to earlier. An outline of an exemplary dynamic calibration and forecasting algorithm is as follows. Note that this algorithm does not require any offline data. Instead, only online data (that is, real-time data) is used.

The equations used in one example as follows.

$$y_t = F_t \alpha_t + v_t, \; v_t \sim N(0, V_t) \quad (1)$$

$$\alpha_t = G_t \alpha_{t-1} + B_t u_t + w_t, \; w_t \sim N(0, W_t) \quad (2)$$

The variables are as follows:

$y_t$: observation vector at time t (e.g., all load observations from streams 1 for a single day);

$v_t$ is the uncertainty associated with the load forecast $y_t$;

$u_t$: regression variables, observed (e.g., includes day-of-week and weather effects, where day-of-week effects are, e.g., weekdays versus weekends);

$\alpha_t$: state vector, unobserved;

$B_t$: matrix of regression variables, unknown;

$F_t$, $G_t$: known matrices, which are pre-defined and derived based on subject matter expertise; and $V_t$, $W_t$: unknown matrices.

Additionally, the following variables are used:

$\theta_{t|s}$: estimate of $\theta_t = \{\alpha_t, B_t\}$ from information available at time s (i.e., $y_r$, $u_r$: r=1, . . . , s, and s represents the hour-of-data of the update data);

$P_{t|s}$: covariance matrix of $\theta_{t|s}$; and $y_{t|s}$: estimate of $y_t$ from information available at times.

As new information arrives, at least the following are performed:

1) current estimates of $\alpha_t$ and $B_t$ are updated using a Kalman filter and a sequence of matrix operations; and 2) current estimates of the matrices $V_t$ and $W_t$ may be updated using dynamic covariance update algorithms. For suitable algorithms and techniques, see K. Triantafyllopoulos, "Covariance Estimation for Multivariate Conditionally Gaussian Dynamic Linear Models", Journal of Forecasting, 26, 551-569 (2008). It is noted that there is an issue about which past data is emphasized. The thesis is that system is dynamic and hence only recent (for instance, data gathered over one week or one month or the like) past data is important.

Figure 3:
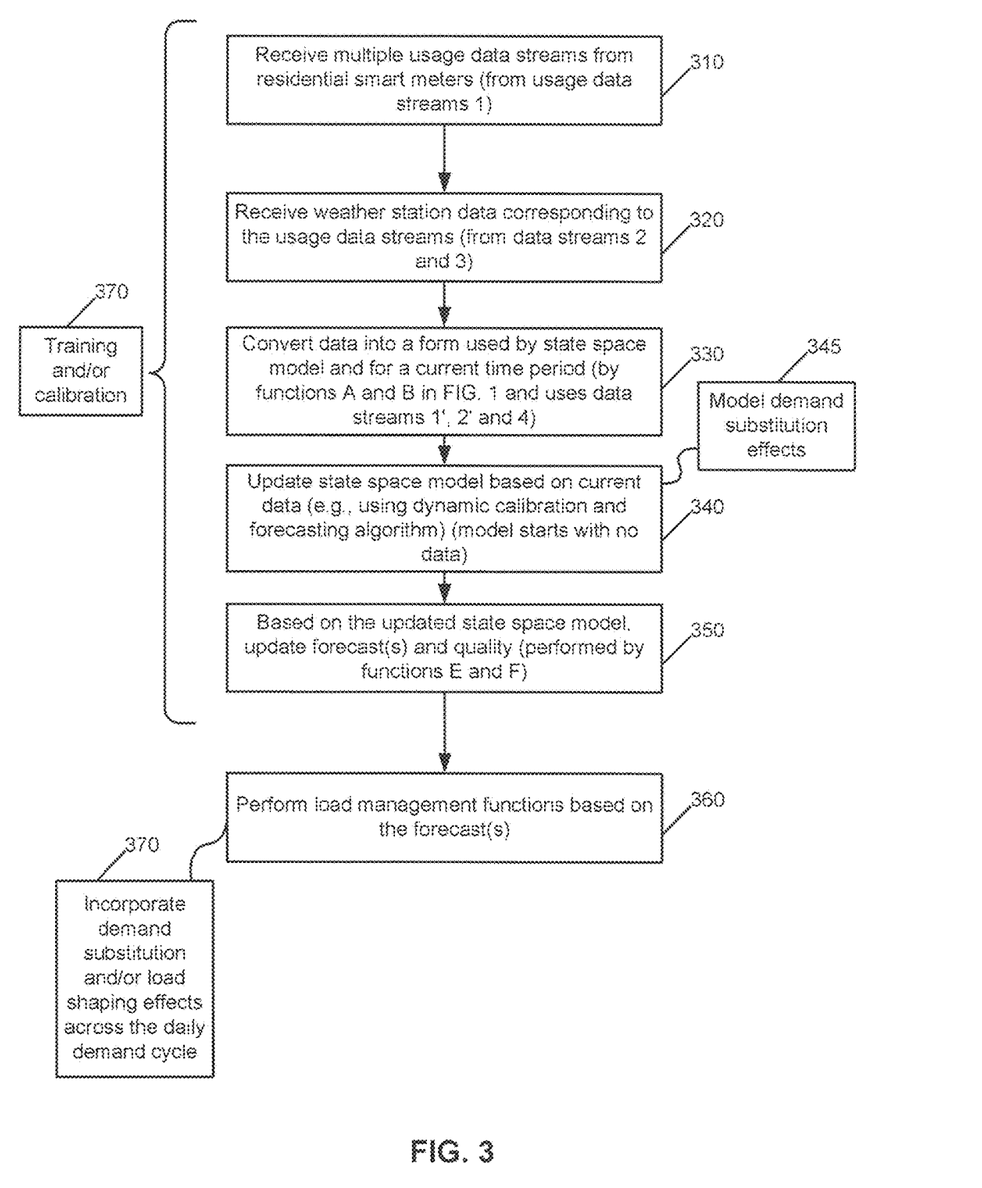
FIG. 3 is a logic flow diagram for real-time forecasting of residential electricity demand in a streams-based architecture, and illustrates the operation of an exemplary method, a result of execution of computer program instructions embodied on a computer readable memory, functions performed by logic implemented in hardware, and/or interconnected means for performing functions in accordance with exemplary embodiments.

Turning to FIG. 3, FIG. 3 is a logic flow diagram for real-time forecasting of residential electricity demand in a streams-based architecture. This figure illustrates the operation of an exemplary method, a result of execution of computer program instructions embodied on a computer readable memory, functions performed by logic implemented in hardware, and/or interconnected means for performing functions in accordance with exemplary embodiments. Most of blocks in FIG. 3 are performed by the streams platform 130, e.g., under control at least in part by the controller 125-3 of the computer system 120 of FIG. 1. Note that the streams operators may be built based in part on other work (in different systems) that has been done and that uses only the incoming data to generate the model. See, e.g., Hosking, J. R. M., Natarajan, R., Ghosh, S., Subramanian, S. and Zhang, X., Short-term forecasting of the daily load curve for residential electricity usage in the Smart Grid. Appl. Stochastic Models Bus. Ind., 29: 604-620 (2013); and U.S. patent application Ser. No. 13/912,181, filed on Jun. 6, 2013, published as U.S. Publication No. 2014/0365022 and U.S. patent application Ser. No. 13/918,312, filed on Jun. 14, 2013, published as U.S. Publication No. 2014/0365024, both of which are entitled "Managing Time-Substitutable Electricity Usage using Dynamic Controls".

In block 310, the streams platform 130 receives multiple usage data streams from residential smart meters (from usage data streams 1). In block 320, the streams platform 130 receives weather station data corresponding to the usage data streams (from data streams 2 and 3). That is, the weather station data is assumed to be from location(s) near the customer premises 190 (e.g., residences) having the residential smart meters 110. The streams platform 130 in block 330 converts data into a form used by state space model and for a current time period. This may be performed by functions A and B in FIG. 1 and uses data streams 1, 1', 2, 2', 3 and 4.

In block 340, the streams platform 130 updates the state space model based on current data (e.g., using the dynamic calibration and forecasting algorithm described above). This block is performed by function D in FIG. 1 and uses data stream 5. It is noted that the state space model would start with no data and the data that is used would be filled entirely from the meters 110 and the weather station data device 120. One example of block 340 is to update the state space model by modeling demand substitution effects (block 345), which is where demand is shifted from one time period (e.g., of high demand) to another period (e.g., of lower demand). These effects were studied in a different context in patent application: U.S. patent application Ser. No. 13/912,181, filed on Jun. 6, 2013, published as U.S. Publication No. 2014/0365022, entitled "Managing Time-Substitutable Electricity Usage using Dynamic Controls". This previous work models demand substitution and load shaping.

In block 350, the streams platform 130, based on the updated state space model, update forecast(s) and quality. This may be performed by functions E and F in FIG. 1B and uses data stream 7.

In block 360, load management functions may be performed based on the forecast(s). These system functions may be performed by the grid controller 185. For instance, in block 370, demand substitution and/or load shaping effects may be incorporated across the daily demand cycle. This may be achieved by communication (e.g., via links 112) between the streams platform 130 and many or all household smart meters 110. The processing system in the streams platform 130 decides on the signals to communicate to the smart meters 110 using, e.g., the logic in block 370 of FIG. 3, and is driven by the information received from 130. In terms of the daily cycle, this manages the intra-day load profile. For instance, the logic in block 370 may be set up to balance load over any 24-hour cycle. Additionally or alternatively, more or less energy may be caused (e.g., or requested) to be generated by generators 193.

The forecasts may be received by analysts, e.g., on a daily basis and if the quality of the forecast is deemed poor, then both the calibration algorithm and the F and G matrices are readjusted appropriately. This should lead to better forecasts and in turn lead to better load management.

The state space model (and other models, if used) may be trained and/or calibrated (block 370), e.g., using known techniques. In an exemplary embodiment, all model training and calibration are performed entirely within the streams platform 130, with no need to use any external storage or processing elements (that is, outside the streams platform 130). Additionally, all forecasting may also be performed entirely within the streams processing platform 130, with no need to use any external storage or processing elements.

It is noted that the forecasts in the examples above may be based on individual customers. However, this is not a limit to the implementation and the streams platform 130 may implement other forecasts. For instance, a streams approach to producing fine-grain forecasts is detailed below.

Figure 4:
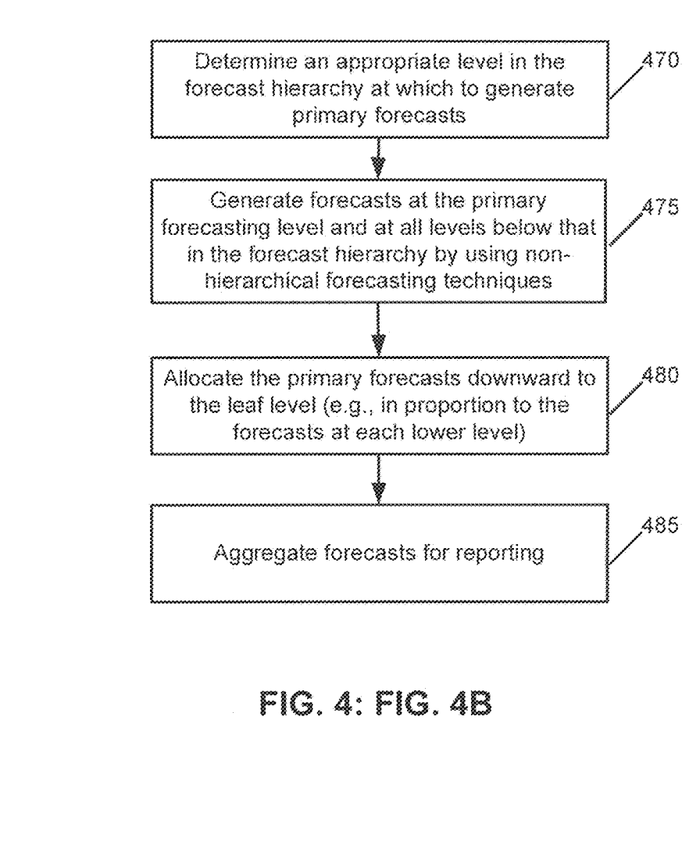

In particular, hierarchical forecasts may be constructed using non-hierarchical forecasting techniques applied at multiple levels of streams aggregation. This is illustrated by FIG. 4, which may be performed, e.g., by the data merging and aggregation B. FIG. 4, which includes FIGS. 4A and 4B, is an illustration of constructing hierarchical forecasts using non-hierarchical forecasting techniques applied at multiple levels of streams aggregation. FIG. 4A illustrates aggregation and forecast hierarchy, and FIG. 4B is a logic flow diagram for constructing hierarchical forecasts. FIG. 4B illustrates the operation of an exemplary method, a result of execution of computer program instructions embodied on a computer readable memory, functions performed by logic implemented in hardware, and/or interconnected means for performing functions in accordance with exemplary embodiments. The blocks in FIG. 4B are performed at least in part by the streams platform 130, e.g., under control of the controller 125-3 of the computer system 120.

In FIG. 4A, there are shown residences 490-1 through 490-12 (as examples of customer premises), which are aggregated into subdivisions 420-1 through 420-4, which are themselves aggregated into neighborhoods 430-1 and 430-2, which are also aggregated to town 440. It should be noted that this process could be continued, e.g., through cities, states, and even nations, and the aggregations could be different (e.g., residences 490 could be aggregated directly to towns 440). Additionally, there could be commercial premises added to this forecast hierarchy 460 or in their own hierarchy. There could be streaming data aggregators 450 (e.g., implemented by the streams platform 130) that perform the aggregations from residences 490, to subdivisions 420, to neighborhoods 430 and then to towns 440. The forecast hierarchy 460 has a highest level at the town 440 and the lowest level at residences 490. That is, the forecast hierarchy 460 is a sequence of single-level drill-downs along the forecast dimensions from the root level (town 440) to the leaf level (residences 490). At some level, forecasting is performed and levels above this are aggregated. For instance, if the forecasting level is the residences 490, the forecasts for the subdivisions 420, neighborhoods 430, and towns 440 are aggregated.

In particular, an appropriate level in the forecast hierarchy is determined at which to generate primary forecasts. See block 470 of FIG. 4B. Note that the appropriate level may be determined by an operator, e.g., by setting a value in the streams platform 130. The streams platform 130 would then use that value to perform block 470. Non-hierarchical forecasting techniques are used to generate forecasts at the primary forecasting level and at all levels below that in the forecast hierarchy. See block 475, which is performed by the streams platform 130. For example, if the subdivision 420 is the primary forecasting level, the neighborhood 430 and town 440 are below this level. In an exemplary embodiment, at the primary level (e.g., subdivision 420), we use a forecasting method like regression to generate forecasts, and then forecasting for lower levels (e.g., neighborhoods 430) would be based on the forecast at this level (e.g., by fixed proportions). That is, the primary forecasts are allocated downward to the leaf level (e.g., in proportion to the forecasts at each lower level). This occurs in block 480, which is performed by the streams platform 130. The intent here is to create report at all appropriate levels. For example, if a state-level forecast is desired, and primary forecasts are the substation level, then all substations in the state are aggregated to produce the report. In other words, the forecasts are aggregated for reporting. See block 485, which is performed by the streams platform 130.

Figure 5:
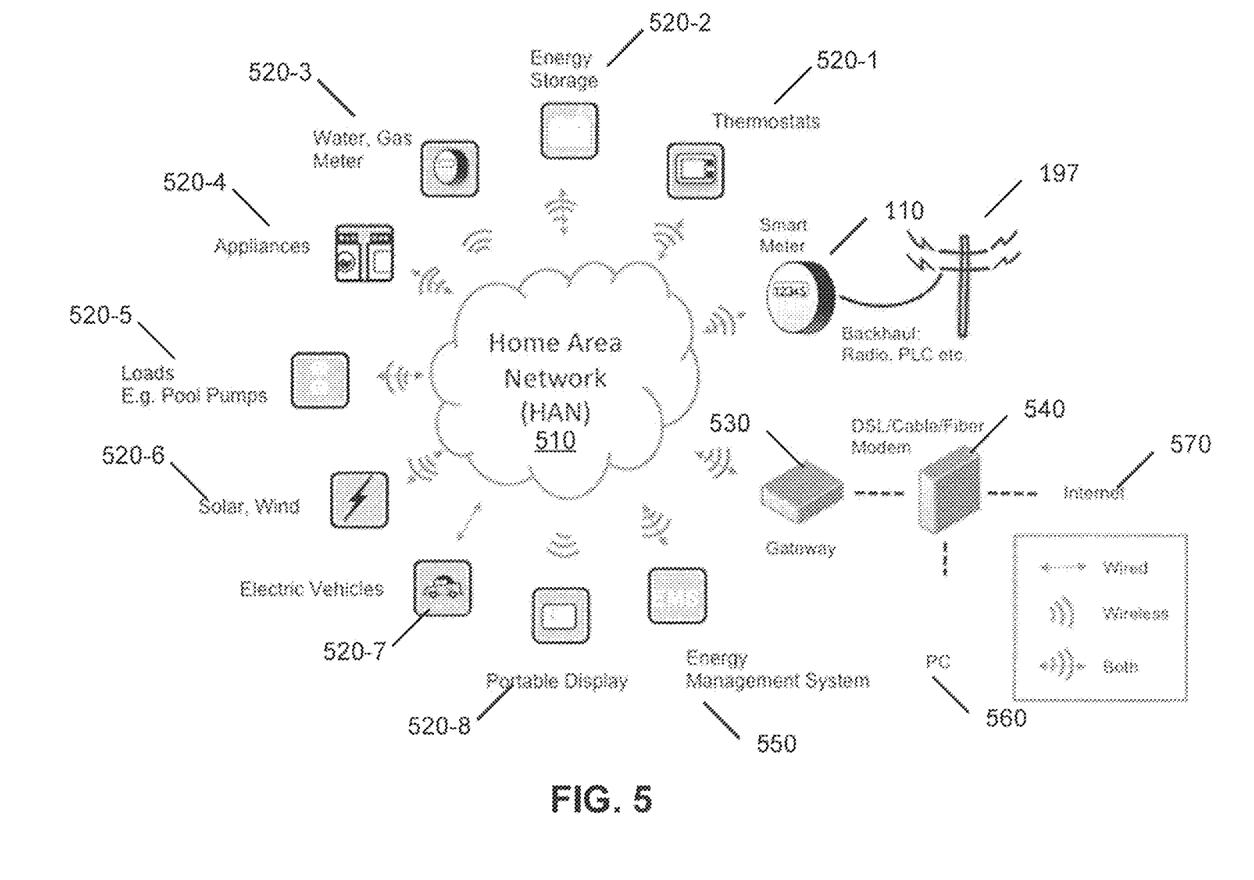
FIG. 5 is an illustration of a residence connected to the electrical grid and having a home area network (HAN) with HAN-connected devices.

In addition to performing real-time forecasting on a residential (or commercial unit) basis, implementations herein also provide a streams approach to personalized energy usage. Turning to FIG. 5, this figure is an illustration of a residence connected to the electrical grid 580 and having a home area network (HAN) 510 with HAN-connected devices 520. In this example, the HAN 510 connects in-home digital devices, such as PCs, mobile phones, entertainment technology, thermostats, home security systems and smart appliances, into a common network. In the context of energy utilities, HAN is a means for utility companies to extend their reach beyond the meter, and to incorporate the "smart thermostat," direct load control appliances, smart appliances and in-home energy display into utility systems, as well as to enable demand response (DR) and energy efficiency programs. The HAN-connected devices 520 include the following exemplary devices: thermostats 520-1; energy storage devices (such as batteries) 520-2; meters 520-3 such as gas and water; appliances 520-4; loads 520-5 such as pool pumps; electricity sources 520-6 such as solar panels (solar) or wind turbines (wind); electric vehicles 520-7 (and their chargers); and portable displays 520-8. The HAN 510 can connect through a gateway 530 and a DSL/cable/fiber modem 540 to the interne 570. A PC (personal computer) 560 is also connected to the modem 540. Additionally, the HAN 510 is connected through the smart meter 110 to the electric grid 197 via a backhaul link such as radio (radio frequency) and/or PLC (power-line communication). FIG. 5 also shows an energy management system 550, which is a system to which the owner of the residence can connect and control various aspects of the HAN 510 and/or the HAN-connected devices 520.

Figure 6:
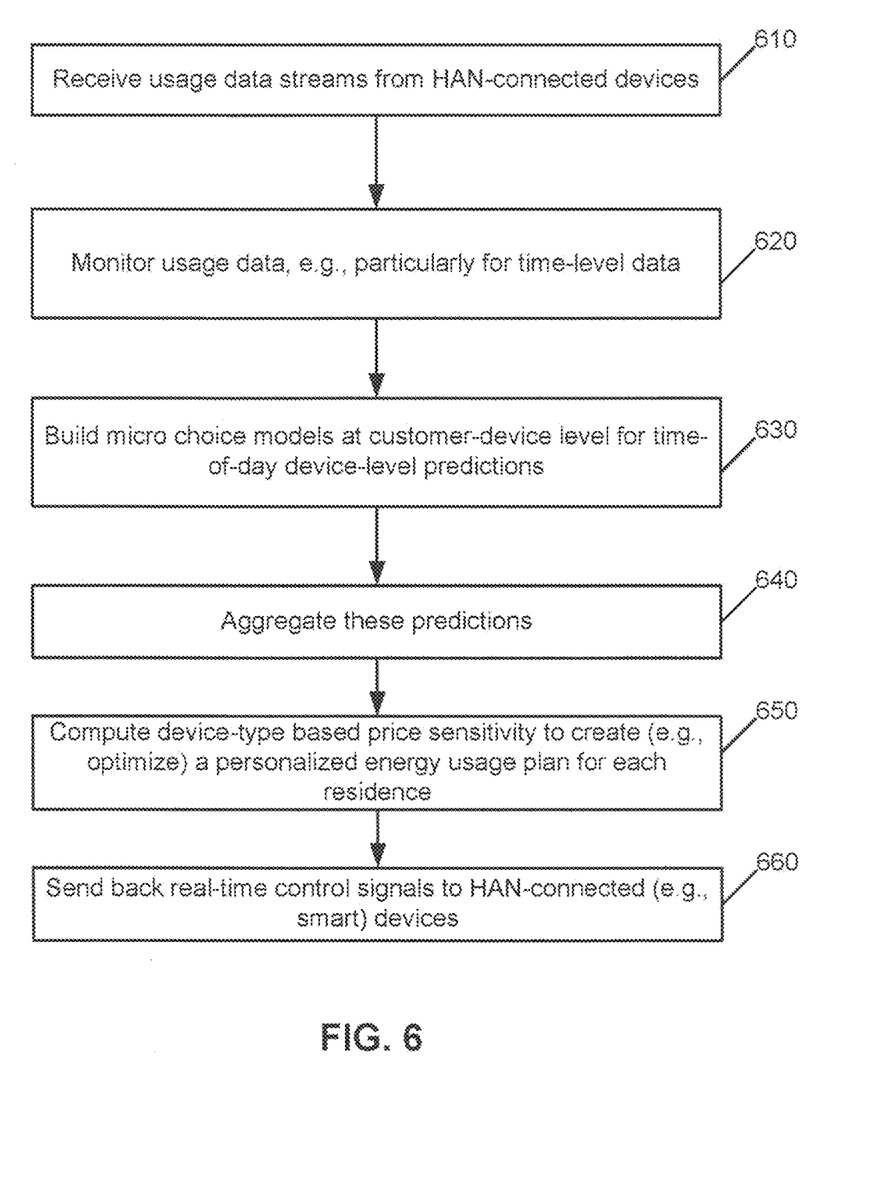
FIG. 6 is a logic flow diagram for a streams-based approach to personalized energy usage, and illustrates the operation of an exemplary method, a result of execution of computer program instructions embodied on a computer readable memory, functions performed by logic implemented in hardware, and/or interconnected means for performing functions in accordance with exemplary embodiments.

Referring to FIG. 6, this figure is a logic flow diagram for a streams-based approach to personalized energy usage. There are multiple possible configurations suitable for performing FIG. 6. As one example, a streams platform 130 could be integrated into a premises 190, such as by adding this functionality to a corresponding smart meter 110. Another example is that all of this data (from multiple homes) will be sent to the streams platform 130 that is in the grid or the cloud, which would then send back the micro-choice model information (described below) to the residence.

FIG. 6 describes a streams-based approach that processes data from smart devices such as appliances (e.g., which transmit their current usage state periodically) and also provides individualized feedback to the devices. Note that a residence (e.g., a customer premise 190) is again considered as the source of the usage streams and is the recipient of the control signals in FIG. 6. However, FIG. 6 has broader applicability, such as to small or large commercial enterprises. This figure illustrates the operation of an exemplary method, a result of execution of computer program instructions embodied on a computer readable memory, functions performed by logic implemented in hardware, and/or interconnected means for performing functions in accordance with exemplary embodiments. The blocks in FIG. 6 are performed at least in part by the streams platform 130, e.g., under control of the controller 125-3 of the computer system 120.

FIG. 6 assumes there is some reason for a person or utility to want to reduce energy usage from appliances or other HAN-connected devices 520 at certain times. Utility companies, for instance, may have implemented time-of-use pricing and have daily rate schedules that change rates depending on the time of day (e.g., or energy draw from the grid).

In block 610, the streams platform 130 receives usage data streams from HAN-connected devices. These streams may be packaged with the usage data streams 1-1 through 1-N from residential smart meters 110, or may be sent separately from those streams. The streams platform 130 in block 620 monitors usage data from the HAN-connected devices 520, e.g., particularly time-level data (such as household identification (ID), appliance type, on/off, usage rate, duration, and the like). The "on/off" may be the time periods on or off, e.g., "4 hours on and 20 hours off". These are important because of the heterogeneity of usage and load levels between appliances, and are important at the higher level between residences.

In block 630, the streams platform 130 builds micro-choice models at customer-device level for time-of-day device-level predictions. A micro-choice model represents a forecasting model calibrated at the household-appliance level. These predictions can be aggregated (e.g., by device-type, for hierarchical time-of-day device usage prediction models). That is, there could be multiple micro-choice models, e.g., for a refrigerator, a freezer, a pool pump, an air conditioning unit, a heat pump, and the like, and the predictions from these can be aggregated. This aggregation occurs in block 640. This aggregation may be by appliance-type (e.g., heat pumps may be aggregated into one appliance-type). In particular, these predictions may be aggregated in order to create household-level forecasts. In simple terms, aggregation is just summation. However, the summation is of random variables and should be done in a statistically accurate manner. In block 650, the streams platform 130 computes device-type based price sensitivity to create (e.g., optimize) a personalized energy usage plan for each residence. In block 660, the streams platform 130 sends real-time control signals to HAN-connected (e.g., smart) devices 520, e.g., based on the personalized energy usage plan for this premises. For instance, the control signals may request the HAN-connected device or devices 520 minimize (if possible) high energy usage at certain times of the day based on the personalized energy usage plan for this premises.

For instance, a refrigerator can reduce energy use on demand, e.g., by delaying defrost cycles to inexpensive rate periods. A dishwasher could delay operation until time periods when utility costs are lower or use a less-energy intensive cycle during times of high energy costs. A range with dual cavities could use (or suggest the use of) the smaller cavity during periods of high energy cost. A hybrid water heater can switch to heat-pump mode and/or modify temperature settings during periods of high rates. Thermostats can decrease temperature in winter or increase temperature in summer during periods of high rates. Washing machines and dryers could delay their start until a period of lower rates or select more energy-efficient cycles in a period of higher rates. The loads 520-5 could delay usage until periods of lower rates, e.g., a pool pump could delay running until a period of lower rate or reduce its speed during a period of a higher rate. The amount of energy in the energy storage device 520-2 or being produced by the solar panels or wind turbines as electricity sources 520-6 could also be taken into account and modify the control signals sent in block 660.

Figure 7:
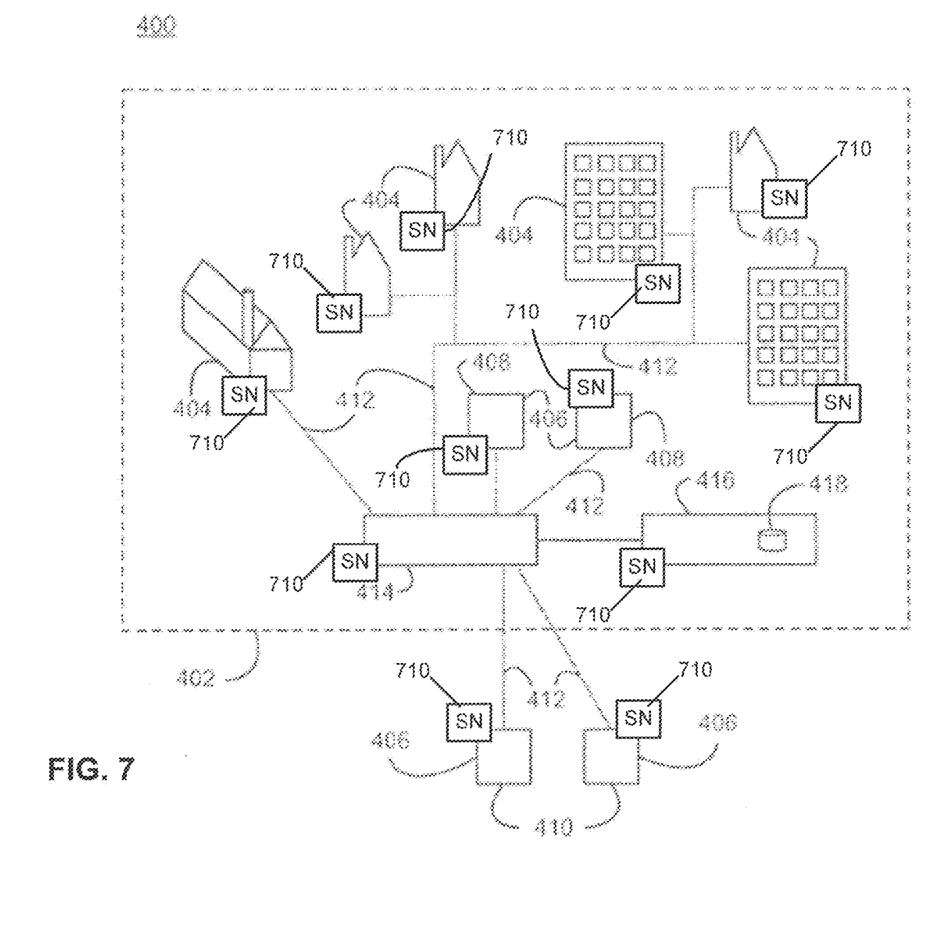
FIG. 7 is an illustration of an embodiment of an electrical distribution system used to control intra-day electrical load demand in accordance with an exemplary embodiment of the present invention.

Referring now to FIG. 7, one exemplary embodiment is directed to a system 400 for controlling intra-day electrical load. This figure is partly from U.S. Publication No. 2014/0365024, filed on Jun. 14, 2013. The system 400 includes an electrical power distribution system 402 that provides electrical power to a plurality of customers 404. Suitable customers include, but are not limited to, single family residences, multi-family residences, commercial properties, manufacturing facilities and government offices. The electrical power distribution system 400 includes at least one electrical power generator 406. Suitable power generators are known and available and include coal powered generators, nuclear powered generators, fossil fuel powered generators and hydro-electrical powered generators. These generators can be internal generators 408, i.e., located within and owned by the electrical power distribution system, and external power generators 410, i.e., located outside the power distribution system 400 and owned by a third party. In general, the outside power generators 410, e.g., the spot market, carry a higher cost to the electrical power distribution system 400 and, therefore, affect the profit margin of the electrical power distribution system 400.

An electrical grid 412 is in communication with the electrical power generators 408/410 and the plurality of customers 404 in order to deliver or distribute power to the customers. Also in contact with the electrical grid 412 is an electrical power grid controller 414 to monitor the electrical load demand in the electrical power distribution system and to control distribution of electrical power from the electrical power generators to the plurality of customers through the electrical grid. An intra-day electrical load controller 416 is provided in communication with the electrical power grid controller. The intra-day electrical load controller includes a computing system or processor for executing one of more software programs to provide the functionality to control intra-day electrical load demand in accordance with the present invention. The intra-day electrical load controller includes a timer module configured to monitor a current time and to divide a day into a plurality of time periods.

Also included is one or more databases 418 used to store computer software to be executed by the intra-day electrical load controller, and data used or generated by the intra-day electrical load controller. These data include, but are not limited to, a current customer price for each one the plurality of time periods, weather condition data, baseline electrical load data, historical data on electrical demand, data on fractions of total daily electrical usage across all time periods, an upper threshold and a lower threshold for any fraction of total daily electrical usage in any time period, a cost of electricity to the supplier of the electrical load, i.e., the electrical load distribution system, a pre-defined limit on a total cost of electricity to any single customer, a baseline total cost to each customer and customer price incentives for each one of the plurality of time periods. Each time period represents a separate and distinct time of day interval, and the sum of all time periods equals twenty four hours.

The streams platform will enable a lot of the data gathering that was previously not possible. Think of a system where a streams node is installed at all interested parties in FIG. 7 (404, 414, 416, 406 408 etc.). The streams nodes (SNs) 710 are shown installed at all nodes in FIG. 4.

Moreover, the installed SNs 710 are able to provide different functionalities at different locations. The most important of these from the instant viewpoint is the possibility of fully-automated forecasting models provided at customers 404 (e.g., loads) and generators 406/408/410 (e.g., renewables) that may be aggregated efficiently in an automated manner to different levels of grid controllers 414 and intra-day electrical load controllers 416.

In general, the full streams platform (e.g., as an SN 710) will be installed at grid operators (such as the power grid controller 414 and larger entities, while light-weight clients (e.g., as an SN 710) will be installed at appropriate locations downstream (of energy flow) at either individual residences or even devices, or at neighborhood level feeders.

The forecasts will feed into manual or automated grid corrective actions: if the aggregated forecasts for the entire region is indicating a mismatch (e.g., shortage or excess of generation), the grid operator will have enough forecast horizon to take optimal intervention actions such as to incentivize residential or industrial loads to change or generators to produce more.

In summary, a novel approach and architecture for residential and commercial electricity demand forecasting is implemented in a streams-based, real-time processing platform. This may entail processing of high-volume, real-time, disaggregated smart meter data. Real-time intra-day forecasts are updated to use the most recent metering and weather forecast data. Exemplary implementations incorporate demand substitution and load shaping effects across the daily demand cycle. Demand substitution shifts demand from one time period (e.g., of high demand) to another period (e.g., of lower demand). Load shaping effects include changing to more energy-efficient operations during periods of high demand. The implementations include entirely streams-based approaches for model calibration and forecasting, and may include hierarchical forecasting to improve forecast accuracy at all levels. Furthermore, personalized appliance usage plans may be created and sent to residences or commercial buildings.

As other examples, a new method and architecture is disclosed for performing the real-time predictive modeling of disaggregated electricity demand in a streams processing environment. This method and architecture may include the following.

1) All model training, calibration and forecasting are performed entirely within the streams processing platform, with no need to use any external storage or processing elements.

2) Implementations may incorporate substitution effects across the daily load cycle within the real-time framework. As explained above, a substitution effect includes shifting demand to time periods with lower rates.

3) Exemplary embodiments provide an adaptive approach that can make use of the most recent observational data and forecasts of the independent variables for performing the forecasts.

4) Hierarchical forecasts can be performed and forecast accuracy can be optimized.

5) Data models and process models for enabling method steps may be used.;

6) A platform is described for applications and experiment design.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method, comprising:
receiving at a streams platform multiple streams of real-time electricity usage data, each of the multiple streams from an electrical meter providing periodic updates to electrical usage for devices connected to the electrical meter, wherein the multiple streams of electricity usage data are for customer premises in an electrical power distribution system;
receiving at the streams platform weather information corresponding to locations where the electrical meters are;
performing by the streams platform real-time predictive modeling of electricity demand based on the received multiple streams of electricity usage data and the received weather information, at least by performing the following:
updating a state space model for electrical load curves using the usage data from the streams and the weather, wherein the updating uses current load observations for the multiple streams for a current time period; and
creating one or more forecasts for the electricity demand, the creating comprising generating one or more primary forecasts at a primary forecasting level in a hierarchy comprising forecasting levels from individual customer premises to multiple additional forecasting levels, wherein the multiple additional forecasting levels comprise aggregated electricity demand from previous levels, and the creating comprising generating forecasts at all levels below the primary forecasting level in the hierarchy, wherein the generating at the primary forecasting level and at all levels below the primary forecasting level uses non-hierarchical forecasting techniques;
outputting by the streams platform the one or more forecasts of the electricity demand; and
performing load management functions in the electrical power distribution system based on the outputted one or more forecasts.

2. The method of claim 1, the electrical meters are connected to customer premises, and wherein model training for the state space model, calibration of the state space model, and forecasting are performed entirely within the streams platform.

3. The method of claim 1, wherein:
updating a state space model for electrical load curves further comprises modeling demand substitution effects in the electrical power distribution system to enable shifting of demand from one time period to another in a daily load cycle; and
performing load management functions comprises incorporating the demand substitution effects across the daily load cycle.

4. The method of claim 1, wherein performing load management functions comprises incorporating load substitution effects across a daily load cycle.

5. The method of claim 1, wherein updating the state space model and creating the one or more forecasts makes use of most recent observational data and forecasts of independent variables in at least the state space model for performing the forecasts.

6. The method of claim 1, wherein creating one or more forecasts for the electricity demand further comprises:
allocating the primary forecasts downward to the leaf level in the hierarchy in proportion to the forecasts at each lower level.

7. The method of claim 6, wherein:
creating one or more forecasts for the electricity demand further comprises aggregating forecasts for reporting.

8. The method of claim 1, wherein the method further comprises for a customer premises:
receiving usage data streams from network-connected electrical devices in the customer premises;
monitoring usage data at least for time-level data;
building at least one model at customer-device level for time-of-day device-level predictions;
aggregating these time-of-day device-level predictions;
computing device-type based price sensitivity to create a personalized energy usage plan for this premises; and
sending back one or more real-time control signals to the network-connected electrical devices based on the personalized energy usage plan for this premises.

9. The method of claim 8, wherein the network-connected electrical devices are connected to a home area network.

10. The method of claim 8, wherein the time-level data comprise one or more of household identification, appliance type, on/off, usage rate, and duration.

11. An apparatus, comprising:
a memory including computer-readable program code; and
one or more processors, wherein the one or more processors are configured, in response to loading and executing the computer-readable program code, to cause the apparatus to perform operations comprising:
receiving multiple streams of electricity usage data, each of the multiple streams from an electrical meter providing periodic updates to electrical usage for devices connected to the electrical meter, wherein the multiple streams of electricity usage data are for customer premises in an electrical power distribution system;
receiving weather information corresponding to locations where the electrical meters are;
performing real-time predictive modeling of electricity demand based on the received multiple streams of electricity usage data and the received weather information, at least by performing the following:
updating a state space model for electrical load curves using the usage data from the streams and the weather, wherein the updating uses current load observations for the multiple streams for a current time period; and
creating one or more forecasts for the electricity demand, the creating comprising generating one or more primary forecasts at a primary forecasting level in a hierarchy comprising forecasting levels from individual customer premises to multiple additional forecasting levels, wherein the multiple additional forecasting levels comprise aggregated electricity demand from previous levels, and the creating comprising generating forecasts at all levels below the primary forecasting level in the hierarchy, wherein the generating at the primary forecasting level and at all levels below the primary forecasting level uses non-hierarchical forecasting techniques;
outputting the one or more forecasts of the electricity demand; and
performing load management functions in the electrical power distribution system based on the outputted one or more forecasts.

12. The apparatus of claim 11, wherein the electrical meters are connected to customer premises, and wherein model training for the state space model, calibration of the state space model, and forecasting are performed entirely within the streams platform.

13. The apparatus of claim 11, wherein:
updating a state space model for electrical load curves further comprises modeling demand substitution effects in the electrical power distribution system to enable shifting of demand from one time period to another in a daily load cycle; and
performing load management functions comprises incorporating the demand substitution effects across the daily load cycle.

14. The apparatus of claim 11, wherein performing load management functions comprises incorporating load substitution effects across a daily load cycle.

15. The apparatus of claim 11, wherein updating the state space model and creating the one or more forecasts makes use of most recent observational data and forecasts of independent variables in at least the state space model for performing the forecasts.

16. The apparatus of claim 11, wherein creating one or more forecasts for the electricity demand further comprises:
allocating the primary forecasts downward to the leaf level in the hierarchy in proportion to the forecasts at each lower level.

17. The apparatus of claim 16, wherein:
creating one or more forecasts for the electricity demand further comprises aggregating forecasts for reporting.

18. The apparatus of claim 11, wherein the one or more processors are configured, in response to loading and executing the computer-readable program code, to cause the apparatus to perform operations for a customer premises comprising:
receiving usage data streams from network-connected electrical devices in the customer premises;
monitoring usage data at least for time-level data;
building at least one model at customer-device level for time-of-day device-level predictions;
aggregating these time-of-day device-level predictions;
computing device-type based price sensitivity to create a personalized energy usage plan for this premises; and
sending back one or more real-time control signals to the network-connected electrical devices based on the personalized energy usage plan for this premises.

19. The apparatus of claim 18, wherein the network-connected electrical devices are connected to a home area network.

20. The apparatus of claim 18, wherein the time-level data comprise one or more of household identification, appliance type, on/off, usage rate, and duration.

21. A computer program product comprises a computer readable storage medium having program instructions embodied therewith, the program instructions executable by a computer system to cause the computer system to perform the following:
receiving at a streams platform multiple streams of electricity usage data, each of the multiple streams from an electrical meter providing periodic updates to electrical usage for devices connected to the electrical meter, wherein the multiple streams of electricity usage data are for customer premises in an electrical power distribution system;
receiving at the streams platform weather information corresponding to locations where the electrical meters are;
performing by the streams platform real-time predictive modeling of electricity demand based on the received multiple streams of electricity usage data and the received weather information, at least by performing the following:
updating a state space model for electrical load curves using the usage data from the streams and the weather, wherein the updating uses current load observations for the multiple streams for a current time period; and
creating one or more forecasts for the electricity demand, the creating comprising generating one or more primary forecasts at a primary forecasting level in a hierarchy comprising forecasting levels from individual customer premises to multiple additional forecasting levels, wherein the multiple additional forecasting levels comprise aggregated electricity demand from previous levels, and the creating comprising generating forecasts at all levels below the primary forecasting level in the hierarchy, wherein the generating at the primary forecasting level and at all levels below the primary forecasting level uses non-hierarchical forecasting techniques;
outputting by the streams platform the one or more forecasts of the electricity demand; and
performing load management functions in the electrical power distribution system based on the outputted one or more forecasts.

* * * * *